United States Patent [19]

Jacinth

[11] Patent Number: 5,743,154
[45] Date of Patent: Apr. 28, 1998

[54] STEERING WHEEL COVER

[76] Inventor: Anthony A. Jacinth, 581 Pomona Ave. #21, Chico, Calif. 95928

[21] Appl. No.: 651,969

[22] Filed: May 21, 1996

[51] Int. Cl.⁶ .................................................. B62D 1/06
[52] U.S. Cl. .................................................. 74/558
[58] Field of Search .......................... 74/558, 558.5, 74/552; 150/154

[56] References Cited

U.S. PATENT DOCUMENTS

| | | | |
|---|---|---|---|
| D. 280,314 | 8/1985 | Strongwater | D12/177 |
| 1,876,993 | 9/1932 | Manning | 74/558 |
| 2,157,950 | 5/1939 | Best | 74/558 |
| 2,309,374 | 1/1943 | Alexander | 74/558 |
| 4,441,382 | 4/1984 | Snooks | 74/558 |
| 4,581,954 | 4/1986 | Uchida | 74/552 |
| 4,800,776 | 1/1989 | Strongwater | 74/558 |
| 5,042,318 | 8/1991 | Franz | 74/558 |
| 5,207,713 | 5/1993 | Park | 74/558 |
| 5,327,799 | 7/1994 | Lin | 74/558 |
| 5,393,298 | 2/1995 | Chang | 601/134 |
| 5,511,445 | 4/1996 | Hildebrandt | 74/558 |

*Primary Examiner*—Charles A. Marmor
*Assistant Examiner*—Mary Ann Battista
*Attorney, Agent, or Firm*—Bradley P. Heisler

[57] ABSTRACT

A removable steering wheel cover 10 is provided which can be securely attached surrounding a steering wheel 2 of a vehicle. The steering wheel cover 10 is formed from an inner layer 30 and an outer layer 20 both formed from flexible fabric and with a core 40 of foam material interposed there between. A first elastic loop 50 and second loop 60 are oriented within a forward casing 25 and a rearward casing 27, respectively, within the steering wheel cover 10. A plurality of stationary tabs 70 are secured to the inner layer 30. A plurality of pivoting tabs 80 are oriented adjacent the forward casing 25 in a location such that they can be folded back onto the stationary tab 70 with the pivoting tabs 80 attaching to the stationary tabs 70. The pivoting tabs 80 overlap the stationary tabs 70 in a manner causing the forward casing 25 and rearward casing 27 to abut each other and to cause the steering wheel cover 10 to completely surround the steering wheel 2. The steering wheel cover 10 can be readily removed for washing or replacement and can then be readily replaced as desired.

16 Claims, 2 Drawing Sheets

STEERING WHEEL COVER

FIELD OF THE INVENTION

The following invention relates to covers for automotive steering wheels and other vehicle steering wheels. More specifically, this invention relates to steering wheel covers which are readily attachable and removable from a steering wheel for replacement or washing of the steering wheel cover.

BACKGROUND OF THE INVENTION

Steering wheels have become a familiar structure in nearly all types of motor vehicles. While steering wheels can take on a variety of different shapes and sizes, they generally are formed in the shape of a circular ring which exhibits a generally circular cross section at any location along the ring. This ring is supported in place by a hub near an axial geometric center of the steering wheel. The hub extends axially into contact with the steering wheel, connecting the steering wheel to a steering shaft which is coupled to other portions of the steering apparatus of the motor vehicle.

Steering wheels are handled by hands of a driver at all times while the motor vehicle is in operation. Hence, the steering wheel is subject to significant wear as the motor vehicle is used. It is also necessary to clean the steering wheel periodically due to the transfer of dirt and debris, as well as oil and sweat from the hands of the operator to the steering wheel. Also, many steering wheels are configured in a manner which is not satisfactorily comfortable for many users.

By providing a cover for the steering wheel, many of the problems associated with use of the steering wheel can be mitigated. For instance, a steering wheel can be made more comfortable and more easy to grip if a cover is provided thereon. Also, an esthetic appearance of the steering wheel can be improved and steering wheel wear can be decreased and transferred the steering wheel cover, which can then be periodically replaced. Also, steering wheel covers can be made from materials which are more readably cleanable than materials from which steering wheels are often manufactured.

Prior art steering wheel covers are known which address certain of the above described problems. However, existing steering wheel covers suffer from a series of drawbacks. Many known steering wheel covers are difficult to attach, requiring either expert installation or a lengthy complex installation process. Other steering wheel covers suffer from not remaining securely in place upon the steering wheel, but rather being subject to twisting and other deformation out of their desired position upon the steering wheel. Many steering wheel covers do not attach securely enough to the steering wheel to provide for safe and effective operation of the steering wheel when the cover is in place. Some steering wheel covers can not be removed easily after being attached to the steering wheel, hence making removable of the steering wheel cover for cleaning and replacement impractical. Finally, many steering wheel covers are not formed from materials which lend themselves periodic cleaning and printing of designs and logos thereon, such that cleaning and adjustment of the appearance of the steering wheel is not easily achieved.

Accordingly, a need exists for an improved steering wheel cover which can be readily attached and detached to a steering wheel. Such an improved steering wheel cover should be comfortable to use, aesthetically pleasing in appearance and be securely attachable to the steering wheel.

SUMMARY OF THE INVENTION

The steering wheel cover of this invention includes an elongate loop of flexible fabric which is easily secured to and removed from a steering wheel, such as a standard automotive steering wheel. The cover is formed with an inner and outer layer sandwiching an open-celled foam, or foam-like material, core there between. Elastic material is oriented along edges of the cover which are biased to tend to draw the cover into a ring of circular cross section, substantially conforming to that the contour of the steering wheel. The fabric forming the inner layer and outer layer is stretchable to allow the inner layer and outer layer to stretch entirely around the steering wheel and yet resist stretch circumferentially so that the cover remains fairly rigidly secured to the steering wheel.

A series of tabs are oriented adjacent each of the edges of the cover. Adjacent one of the edges the tabs are stationary and oriented on an inside surface of the inner layer, with an attachment surface thereof facing towards an axial center of the steering wheel. The opposite edge supports a series of pivoting tabs which have a connection surface which faces away from an axial center of the steering wheel. The stationary tabs and pivoting tabs are configured with opposite halves of a hook and eyelet fastening means, such as that marketed under the trademark Velcro, so that the steering wheel cover can be oriented around the steering wheel and the stationary tabs and pivoting tabs can be attached together with the steering wheel cover completely surrounding the steering wheel.

The stationary tabs and pivoting tabs are oriented such that edges of the cover are oriented abutting each other when the tabs are connected to each other. Hence, the cover completely surrounds the steering wheel cover without leaving a significant portion of the steering wheel exposed between the edges of the cover. The outer surface of the outer layer is formed from a material which allows printing to occur directly upon the fabric forming the outer layer, such that various different designs or logos can be placed thereon, such as by silk screening. The entire cover is made from materials which are substantially non-reactive to water and detergents, such that the cover can be easily washed.

OBJECTS OF THE INVENTION

Accordingly, a primary object of the present invention is to provide a steering wheel cover which is readily attachable and removable from a motor vehicle steering wheel.

Another object of the present invention is to provide a steering wheel cover which is formed from washable materials.

Another object of the present invention is to provide a steering wheel cover which is formed from materials which are sufficiently elastic that the steering wheel cover stretches to conform to steering wheels of various different configurations.

Another object of the present invention is to provide a steering wheel cover which is secured to the steering wheel with hook and eyelet fasteners, such as Velcro, such that the steering wheel cover can be readily attached and detached from the steering wheel.

Another object of the present invention is to provide a steering wheel cover which can be printed upon by silk screening and other printing techniques.

Another object of the present invention is to provide a steering wheel cover which resists slippage when oriented upon a steering wheel.

Another object of the present invention is to provide a steering wheel cover which exhibits biased elasticity with greater axial elasticity and lesser circumferential elasticity, such that a major diameter of the entire steering wheel cover remains relatively constant, but a minor diameter, or width, of the cover can be significantly altered to stretch the cover tightly around the steering wheel.

Other further objects of this invention will become apparent from a careful reading of the disclosure contained herein and upon reading the claims.

DESCRIPTION OF THE PREFERRED EMBODIMENT

Figure 1:
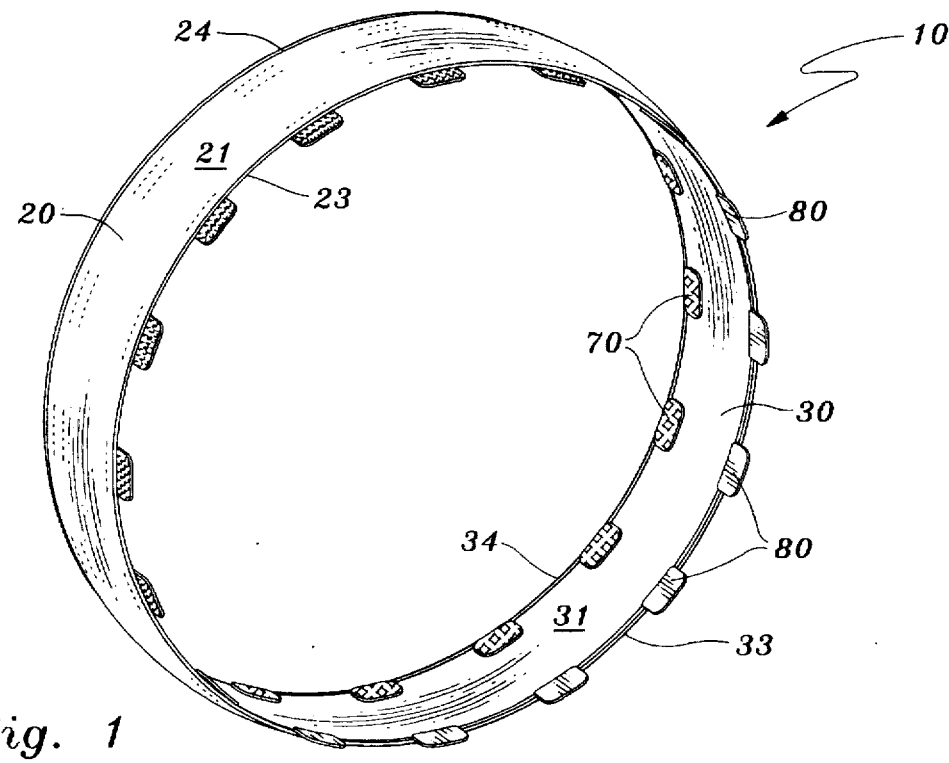
FIG. 1 is a perspective view of the steering wheel cover of this invention in a stretched configuration before orientation overlying a steering wheel.
Figure 2:
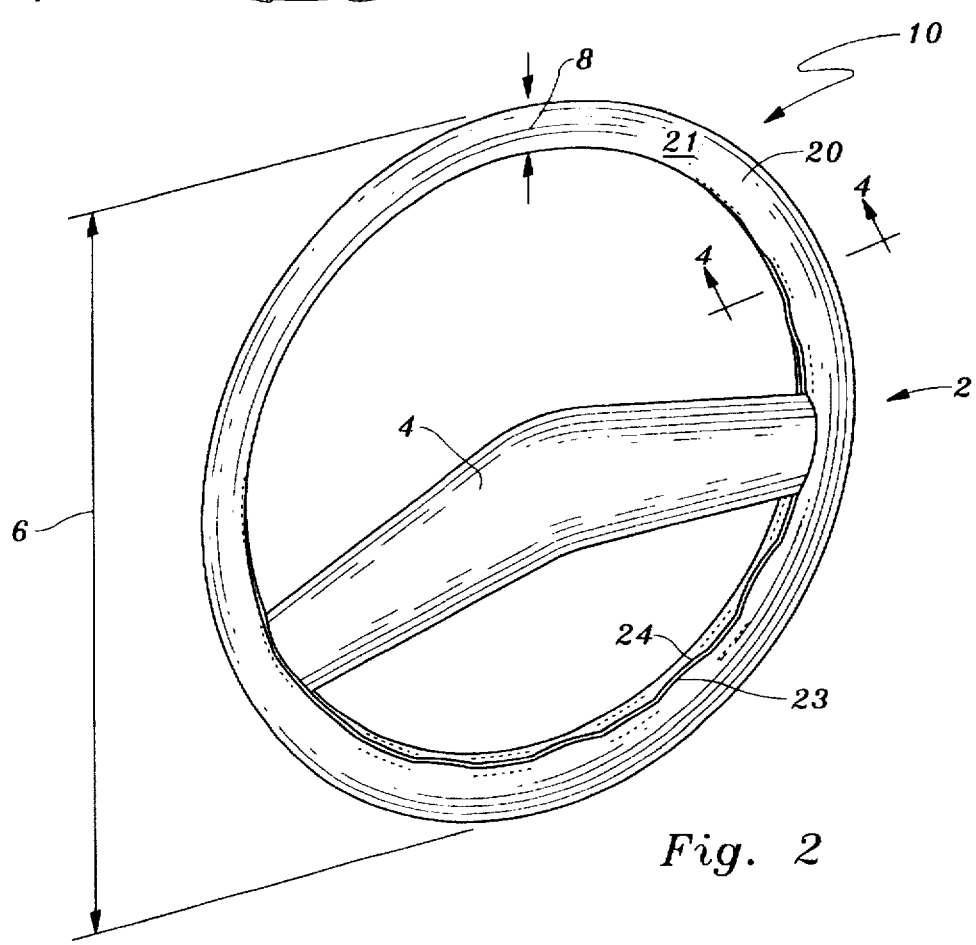
FIG. 2 is an perspective view of steering wheel cover of this invention in place upon a motor vehicle steering wheel.

With reference to the drawings wherein like reference numerals represent like parts throughout the drawings, reference numeral 10 (FIG. 1) is directed to a steering wheel cover for a motor vehicle steering wheel 2 (FIG. 2). Common steering wheels 2 include a hub 4 which supports the steering wheel 2 and connects the steering wheel 2 to other portions of the motor vehicle steering mechanism. The steering wheel 2 is substantially circular with a major diameter 6 representing a diameter of the ring forming the steering wheel 2 and a minor diameter 8 representing a diameter of an individual cross sectional section of the steering wheel 2 which is also generally circular.

In essence, and with reference to FIG. 1, the steering wheel cover 10 is formed from an outer layer 20 of flexible fabric and an inner layer 30 of flexible fabric. Both the outer layer 20 and inner layer 30 are substantially cylindrical in form. The outer layer 20 includes an outer surface 21 which forms an outermost extent of the steering wheel cover 10. The outer layer 20 extends between a forward edge 23 and a rearward edge 24. The inner layer 30 has an inside surface 31 which defines an innermost portion of the steering wheel cover 10. The inside surface 31 extends between a front edge 33 and a rear edge 34.

A plurality of stationary tabs 70 are affixed to the inside surface 31 of the inner layer 30 of the cover 10. A plurality of pivoting tabs 80 are affixed to the steering wheel cover 10 adjacent the forward edge 23 and front edge 33 of the outer layer 20 and inner layer 30, respectively. The pivoting tab 80 and stationary tab 70 are configured to be attachable together (FIGS. 2 and 4) such that the generally cylindrical form of the cover 10 can be distorted into that of a ring of circular cross section (FIG. 2).

Figure 3:
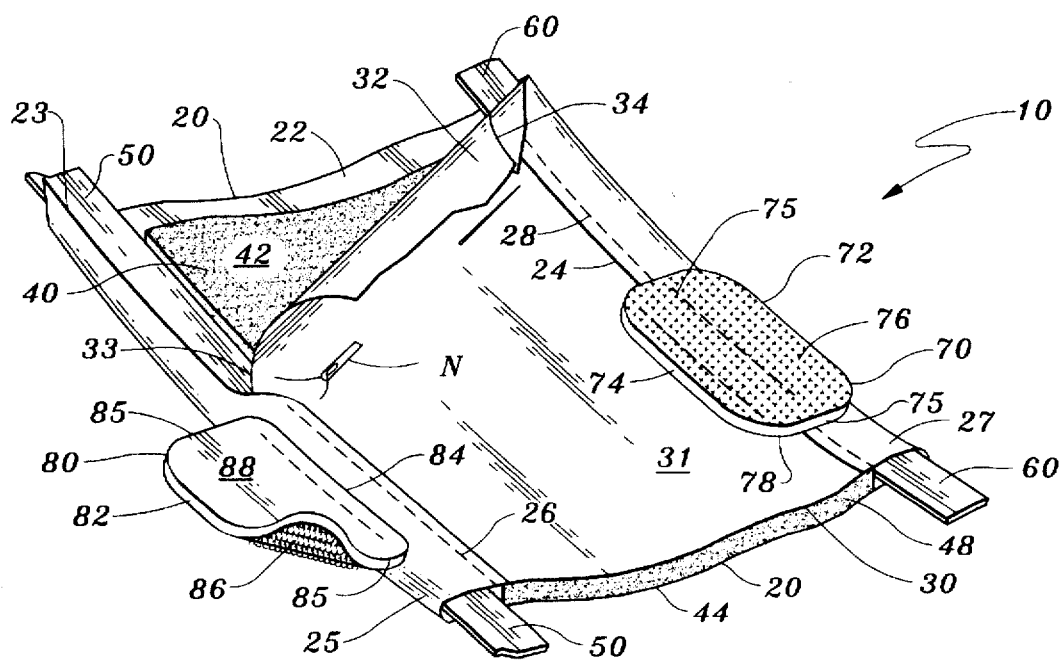
FIG. 3 is a perspective view of a portion of that which is shown in FIG. 1 with various different features of the steering wheel cover cut away to reveal interior details of the steering wheel cover.
Figure 4:
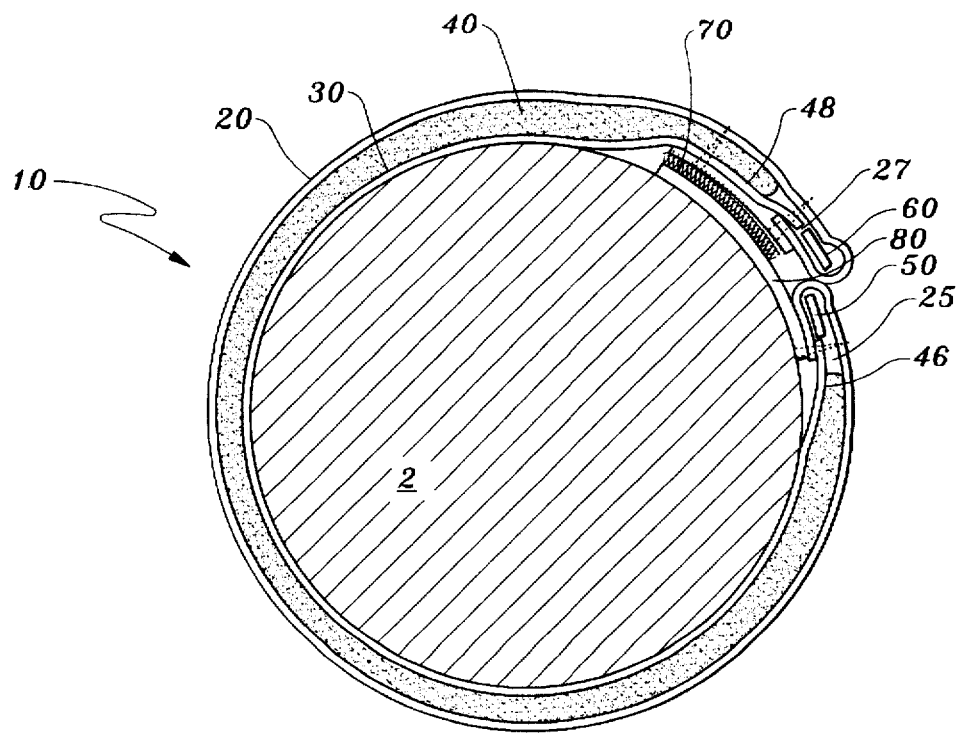
FIG. 4 is a sectional view taken along lines 4—4 of FIG. 2 revealing interior details of the steering wheel cover.

More specifically, and with particular reference to FIGS. 1, 3 and 4, details of the individual parts of the steering wheel cover 10 are provided. The steering cover 10 is generally a textile product formed from the connection of various different layers of fabric and other structures, primarily through the use of seams of thread to hold the various different layers together.

The outer layer 20 is preferably formed from a flexible and elastic fabric, such as that which is marketed under the trademark Spandex, which exhibits a bias. That is, the fabric forming the outer layer 20 preferably has a greater amount of stretch in one direction than it does in a second direction perpendicular to the first direction. The outer layer 20 is oriented such that its direction of greatest stretch is arranged as its width in forming the steering wheel cover 10 and the direction of least stretch is the longest circumferential direction for the steering wheel cover 10. Hence, the outer layer 20 generally has a circumference, and major diameter, which is similar for the outer layer 20 whether stretched or unstretched. This circumference is sized to match that of the steering wheel 2. However, a width of the outer layer 20 between the forward edge 23 and rearward edge 24 can be stretched significantly to exhibit differing dimensions, and to assist the outer layer 20 in stretching around the steering wheel 2 to completely surround the steering wheel 2.

The outer layer 20 includes the outer surface 21 opposite an inner surface 22. The inner surface 22 faces into an interior of the steering wheel cover 10 as will be described below. The forward edge 23 is preferably folded over itself and sewn with a forward straight stitch 26 to form a forward casing 25 (FIGS. 3 and 4). The rearward edge 24 is also preferably rolled over itself and sewn with a rearward straight stitch 28 to form a rearward casing 27. These casings 25, 27 are preferably of a substantially constant cross sectional size around a circumference of the steering wheel cover 10. The casings 25, 27 are essentially tunnels extending along the entire circumference of the steering wheel cover 10 adjacent the forward edge 23 and rearward edge 24.

The inner layer 30 is preferably formed from a similar material to that used in forming the outer layer 20. Also, the inner layer 30 is preferably oriented with a bias of the material arranged similarly to that of the outer layer 20. The inner layer 30 and outer layer 20 are preferably oriented parallel to each other such that they operate similarly when stretched and do not distort the steering wheel cover 10. Preferably, the inner layer 30 has an inside surface 31 parallel to and spaced from an outside surface 32 which faces into an interior of the steering wheel cover 10 to be described below. The inner layer 30 includes a front edge 33 and rear edge 34. Preferably, the front edge 33 is held in place adjacent the outer layer by the forward straight stitch 26. Preferably, the rear edge 34 is held in place adjacent the rearward edge 24 by the rearward straight stitch 28.

The forward straight stitch 26 and rearward straight stitch 28 are spaced away from each other by distance which defines a width of a core 40 within the steering wheel cover 10. The core 40 is bounded by the outside surface 32 of the inner layer 30 and the inner surface 22 of the outer layer 20 and by the forward straight stitch 26 and the rearward straight stitch 28. The core 40 is preferably not empty but rather is formed of an open-celled foam material. This open-celled foam core 40 includes a top surface 42 adjacent to the outside surface 32 of the inner layer 30, a bottom surface 44 adjacent to the inner surface 22 of the outer layer 20, a leading edge 46 adjacent the forward straight stitch 26 and a trailing edge 48 adjacent the rearward straight stitch 28.

The core 40 preferably exhibits an open-celled foam structure so that if the core is exposed to water or other liquids, the liquids can penetrate the core to clean the core, but also can readily escape the core during a drying operation. Hence, the core 40 of the steering wheel cover 10 is readily washable along with the other portions of the steering wheel cover 10. The core 40 can exhibit various different thicknesses between the top surface 42 and the bottom surface 44, depending on the particular preference of the user. Alternatively, the core 40 could be of a variety of foam-like materials.

A first elastic loop 50 is oriented within the forward casing 25. The first elastic loop 50 is preferably formed from a highly elastic material such as rubber. The first elastic loop 50 can either be a continuous loop or can be a linear piece of elastic material which is secured at ends thereof to itself to form a loop. The first elastic loop 50 is preferably of a length such that it exhibits a greater contraction force than other portions of the steering wheel cover 10, causing the loop 50 to draw the steering wheel cover 10 securely against the steering wheel 2, when the cover 10 is oriented around the steering wheel 2 and released, allowing the loop 50 to contract.

A second elastic loop 60 is configured similar to the first elastic loop 50, except that it is located within the rearward casing 27. The second elastic loop 60, along with the first elastic loop 50, define an inner diameter for the steering wheel cover 10 when it is in place about the steering wheel 2. Because the elastic loops 50, 60 are highly elastic, they assist the steering wheel cover 10 in being drawn tightly around the steering wheel 2, causing the cover 10 to surround the steering wheel 2.

A fastening means is provided to fasten the forward edge 23 and rearward edge 24, along with the front edge 33 and rear edge 34, tightly together when the steering wheel cover 10 is oriented in place around a steering wheel 2. The fastening means includes a series of stationary tabs 70 and pivoting tabs 80 which can connect together at intervals along the steering wheel cover 10 to draw the rearward edge 24 and rear edge 34 to a location adjacent the forward edge 23 and front edge 33.

The stationary tab 70 is a substantially rectangular planar construct having an outer edge 72 parallel to and spaced to an inner edge 74 and two side edges 75 parallel to and spaced from each other. The stationary tab 70 includes an attachment surface 76 parallel to and spaced from a backing 78. The backing 78 is oriented adjacent the inside surface 31 of the inner layer 30 in a manner which causes the backing 78 to be entirely securely attached to the inside surface 31 of the inner layer 30. Hence, the stationary tab 70 does not move with respect to the inside surface 31 of the inner layer 30 in any manner. While attachment of the stationary tab 70 to the inner layer 30 could occur in a variety of fashions, preferably the stationary tab 70 is sewn to the inside surface 31 of the inner layer 30. The stationary tab 70 is preferably oriented with the outer edge 72 adjacent and parallel to the rear edge 34 and rearward edge 24 of the steering wheel cover 10. The attachment surface 76 of the stationary tab 70 is preferably configured with loops forming one half of a hook and loop type fastening system, such as that provided under the trademark Velcro.

The pivoting tab 80 is preferably a substantially rectangular planar construct which includes a free edge 82 parallel and spaced from an attached edge 84 and lateral edges 85 parallel to and spaced from each other. The pivoting tab 80 includes a connection surface 86 parallel to and spaced from a smooth surface 88. Preferably, the pivoting tab 80 is attached to the forward edge 23 and front edge 33 of the steering wheel cover 10 such as by sewing. The pivoting tab 80 is only connected along the attached edge 84, such as with a single line of thread stitching.

The connection surface 86 of the pivoting tab 80 is provided with hooks complemental to the loops of the hook and loop type fastener discussed above. Hence, the pivoting tab 80 is removably connectable to the stationary tab 70 for easy removable and reattachment of the steering wheel cover 10 when desired, such as when washing of the steering wheel cover 10 is desired. The orientation of hooks on the pivoting tab 80 and loops on the stationary tab 70 can be easily swapped if desired. It is also possible that some of the pivoting tabs 80 support loops and some of the pivoting tabs 80 support hooks, so long as the stationary tab 70 to which the pivoting tab 80 connects has the opposite complemental hook or loop material for connection of the pivoting tab 80 to the stationary tab 70.

The attached edge 84 is preferably oriented upon the inside surface 31 of the inner layer 30, but so close to the front edge 33 and forward edge 23, that the free edge 82 of the pivoting tab 80 extends significantly beyond the forward edge 23 and front edge 33 of the inner layer 30. Alternatively, the pivoting tab 80 could extend directly from the front edge 33 and forward edge 23. The pivoting tab 80 is oriented with the connection surface 86 facing in a common direction with that of the outer surface 21 of the outer layer 20 and with the smooth surface 88 facing in a common direction with the inside surface 31 of the inner layer 30. Hence, the attachment surface 76 and connection surface 86 face in opposite directions with respect to each other.

When the steering wheel cover 10 is oriented in place surrounding a steering wheel 2, the pivoting tab 80 can be oriented under the rearward edge 24 and rear edge 34 allowing the connection surface 86 to attach to the attachment surface 76 of the stationary tab 70. In this configuration, the forward edge 23 and rearward edge 24 abut each other and the front edge 33 and rear edge 34 abut each other with the pivoting tab 80 and stationary tab 70 totally concealed beneath the inside surface 31 of the steering wheel cover 10 (FIG. 2).

The forward casing 25 and rearward casing 27 are oriented essentially adjacent each other. Hence, only a small seam is visible between the forward casing 25 and rearward casing 27 and the steering wheel 2 is substantially entirely covered by the steering wheel cover 10. The connection surface 86 of the pivoting tab 80 is provided with hooks complemental to the loops of the hook and loop type fastener discussed above. Hence, the pivoting tab 80 is removably connectable to the stationary tab 70 for easy removable and reattachment of the steering wheel cover 10 when desired, such as when washing of the steering wheel cover 10 is desired.

The material forming the inner layer 30 and outer layer 20 is preferably such that it does not snag when it comes into contact with the hooks of the hook and loop type fastener upon the attachment surface 76 and connection surface 86 of the stationary tab 70 and pivoting tab 80. This fabric is also preferably of a type which facilitates printing such as with silk screening processes, allowing various different designs, logos and other patterns to be printed directly onto the outer layer 20 to provide a visually aesthetic appearance when oriented upon a steering wheel 2. Preferably the fabric of both the outer layer 20 and inner layer 30 are such that they are not altered when exposed to water and water soluble detergents, such as would occur during a washing process. It is also desirable that the material forming the fabric of the outer layer 20 and the inner layer 30 do not react significantly to high temperatures such as those which exist in commercial fabric dryers and within an automobile on a hot summer day. One fabric which has proven effective is marketed under the name spandex.

As shown in FIG. 2, the hub 4 of the steering wheel 2 tends to block the tabs 70, 80 from attaching to each other at locations along the steering wheel 2 where the hub 4 attaches to the steering wheel 2. The stationary tabs 70 and pivoting tabs 80 are preferably oriented along the steering wheel cover 10 at discrete locations, rather than with a single continuous stationary tab 70 and pivoting tab 80. Hence, for instance, an inch of space might be provided between adjacent individual stationary tabs 70 and between adjacent pivoting tabs 80, such that gaps are provided through which the hub 4 can extend. Also, it is acceptable that certain of the stationary tabs 70 and pivoting tabs 80 might not be used if the hub 4 location so dictates. In such a case, the pivoting tab 80 would be bent under so that the smooth surface 88 would be oriented adjacent the inside surface 31 of the inner layer 30 and not dangle in a position adjacent the hub 4 which would be visible.

While the above description of the invention is preferred, various different alternatives embodiments of this invention are contemplated which are also considered to be within the scope of this invention. For instance, while Velcro-type hook and loop fasteners are preferred for attachment of the pivoting tab 80 to the stationary tab 70, various other types of fastening devices could be provided, such as adhesives, magnets, snaps, or other temporary fasteners. Also, while spandex is identified as a preferred material, it is understood that various different materials could be utilized for this invention with effective results obtained.

Various different dimensions can be provided for the steering wheel cover 10, so long as the dimensions are generally similar to that of a steering wheel 2 to which the steering wheel cover 10 is to be attached. In essence, a circumference of the steering wheel cover 10 is configured to be substantially similar to, but perhaps slightly greater than a circumference of the steering wheel 2. A width of the steering wheel cover 10 is provided which is similar to a minor circumference of the steering wheel 2 which corresponds to the minor diameter 8 of the steering wheel 2. If the fabric utilized in forming the steering wheel cover 10 is highly elastic, the width of the steering wheel cover 10 need only be within a range such that the steering wheel cover 10 can be elastically stretched to surround the steering wheel 2. In addition, other modifications to this invention are apparent from a reading of the claims included herein and from review of the drawings.

What is claimed is:

1. A cover for a substantially circular steering wheel, comprising in combination:

a single continuous loop of flexible material having an inside surface and an outer surface, said material having two substantially circular edges, including a forward edge and a rearward edge, spaced from each other by a width of said inside surface and said outer surface, said width of said inside surface and said outer surface similar to a circumference of a section of the steering wheel, each of said edges including a means to fasten to an opposite said edge of said material, with said forward edge abutting at least a portion of said rearward edge, when said material is wrapped around said steering wheel, said fastening means including at least one attachment surface and at least one connection surface, said attachment surface configured to adhere to said connection surface, said attachment surface secured to said forward edge and said connection surface secured to said rearward edge, wherein said fastening means includes at least one stationary tab secured to said inside surface adjacent one of said two substantially circular edges of said material, and at least one pivoting tab, said pivoting tab attached to said material adjacent the other of said two substantially circular edges of said material, said stationary tab supporting said attachment surface of said fastening means thereon and said pivoting tab supporting said connection surface of said fastening means thereon, said connection surface of said pivoting tab extending from an attached edge of said pivoting tab adjacent said forward edge to a free edge of said pivoting tab opposite said forward edge, and said attachment surface of said stationary tab extending from an outer edge of said stationary tab adjacent said rearward edge to an inner edge of said stationary tab, said inner edge adjacent said inside surface, said attachment surface on a side of said stationary tab opposite said inside surface.

2. The cover of claim 1 wherein said connection surface supported by said pivoting tab is located on a side of said pivoting tab most distant from a geometric center of said loop of flexible material and wherein said attachment surface supported by said stationary tab is located on a side of said stationary tab closest to said geometric center of said loop of flexible material.

3. The cover of claim 2 wherein both said attachment surface and said connection surface are configured to include opposite halves of a hook and loop-type fastener, said hook and loop-type fastener including a plurality of hooks configured to be complemental to a plurality of loops, said hooks being removably connectable to said loops, allowing said connection surface to be removably attached to said attachment surface.

4. The cover of claim 3 wherein said forward edge and said rearward edge are oriented substantially parallel to each other such that said loop of flexible material exhibits a substantially constant width between said forward edge and said rearward edge, said forward edge and said rearward edge each including a separate elastic loop attached thereto, each said elastic loop concealed within one of two casings, one of said casings extending along said forward edge and one of said casings extending along said rearward edge and between said inside surface and said outer surface.

5. The cover of claim 4 wherein said loop of flexible material includes an inner layer supporting said inside surface thereon and an outer layer supporting said outer surface thereon, said inner layer and said outer layer formed from a similar material.

6. The cover of claim 5 wherein a foam is interposed between said inner layer and said outer layer, said foam dimensioned to substantially fill a space between said inner layer and said outer layer, said foam having a width between a leading edge and a trailing edge similar to a distance between said two casings, said leading edge adjacent one of said casings and said trailing edge adjacent another of said casings; and wherein said stationary tab is adjacent a portion of said inner layer overlying said foam.

7. The cover of claim 6 wherein said inner layer, said outer layer and said foam are each formed from materials which exhibit elasticity, such that said loop of flexible material forming said cover can be elastically stretched and can return to its original shape when unstretched, without permanent deformation thereof.

8. The cover of claim 7 wherein said inner layer and said outer layer are formed from a material which exhibits a greater amount of elasticity in one direction than an amount of elasticity exhibited in a second perpendicular direction, said inner layer and said outer layer configured within the cover such that said loop of flexible material forming said cover exhibits greater elasticity axially than circumferentially.

9. The cover of claim 8 wherein said inner layer, said outer layer and said foam are all formed from materials which are substantially unaltered when washed with water and detergents, said foam formed from an open-celled foam, such that water trapped within pores within the foam can readily escape, such that said cover can be effectively dried after washing.

10. A removable cover for a steering wheel of circular shape and circular cross section, having a major diameter corresponding to a major circumference and a minor diameter corresponding to a minor circumference, said cover comprising in combination:

a flexible cylindrical piece of fabric having a circumference similar to the major circumference of the steering wheel and a width similar to the minor circumference of the steering wheel, said fabric being substantially unaltered when exposed to water and detergents, said width of said flexible cylindrical piece of fabric bounded by two parallel edges including a forward edge and a rearward edge, each of said edges including a means to fasten to an opposite one of said two parallel edges of said fabric when said fabric is wrapped around said steering wheel, said fastening means including at least one attachment surface and at least one connection surface, said attachment surface configured to adhere to said connection surface, said attachment surface secured to one of said edges and said connection surface secured to the other of said edges, wherein said fastening means is oriented upon at least two tabs, a first said tab being pivotable and a second said tab being stationary, wherein said flexible cylindrical piece of fabric includes at least two layers with a foam core between said two layers, each of said layers and said foam core being formed of materials which are substantially nonreactive to water and water soluble detergents, said connection surface of said pivoting tab extending from an attached edge of said pivoting tab adjacent said forward edge to a free edge of said pivoting tab opposite said forward edge, and said attachment surface of said stationary tab extending from an outer edge of said stationary tab adjacent said rearward edge to an inner edge of said stationary tab, said inner edge adjacent an inside surface, said attachment surface on a side of said stationary tab opposite said inside surface.

11. A steering wheel cover, comprising in combination:

a flexible elastic loop of fabric having a circumference similar to a circumference of a steering wheel and a width, said width similar to a circumference of a section of said steering wheel when said fabric is stretched to a stretched width greater than an unstretched width of said fabric, said stretched width and said unstretched width of said fabric defined by substantially parallel edges of said loop including a forward edge and a rearward edge, each said edge including a means to fasten to an opposite said edge of said fabric when said fabric is wrapped around said steering wheel, and said fastening means including at least one attachment surface and at least one connection surface, said attachment surface configured to adhere to said connection surface, said attachment surface secured to one of said edges and said connection surface secured to another of said edges, wherein said fastening means includes at least one stationary tab secured to an inside surface adjacent one of said edges of said loop, and at least one pivoting tab, said pivoting tab attached to said loop adjacent another of said edges of said loop, said stationary tab supporting said attachment surface of said fastening means thereon and said pivoting tab supporting said connection surface of said fastening means thereon, said connection surface of said pivoting tab extending from an attached edge of said pivoting tab adjacent said forward edge to a free edge of said pivoting tab opposite said forward edge, and said attachment surface of said stationary tab extending from an outer edge of said stationary tab adjacent said rearward edge to an inner edge of said stationary tab, said inner edge adjacent said inside surface, said attachment surface on a side of said stationary tab opposite said inside surface.

12. The steering wheel cover of claim 11 wherein said fabric exhibits a greater amount of elasticity along said unstretched width between said edges than an amount of elasticity exhibited along a circumference of said flexible elastic loop.

13. The steering wheel cover of claim 12 wherein said flexible elastic loop of fabric includes an inner layer and an outer layer, wherein each of said layers is formed from a similar material, said material having a different elasticity in a first direction than an elasticity exhibited in a second perpendicular direction, said inner layer and said outer layer configured such that a direction of increased stretch is aligned between said inner layer and said outer layer.

14. The steering wheel cover of claim 13 wherein a foam is oriented between said inner layer and said outer layer, said foam formed of an open-cell foam which can be readily dried after washing with water, said foam oriented to extend to a location adjacent a portion of said inner layer where said stationary tab is attached to said inside surface, such that said stationary tab overlies a portion of said foam with said inner layer between said stationary tab and said foam.

15. The steering wheel cover of claim 14 wherein a casing is provided along each of said edges of said flexible elastic loop, each said casing including a strip of elastic material therein, said elastic material extending entirely around a circumference of said flexible elastic loop of fabric, said elastic material configured to cause said edges of said flexible elastic loop to seek an overall circumferential size which is less than that of other portions of said flexible elastic loop, such that said edges of said flexible elastic loop tend to be drawn toward an interior side of said flexible elastic loop and hence onto an inner side of the steering wheel when said flexible elastic loop of fabric is oriented overlying the steering wheel.

16. The steering wheel cover of claim 15 wherein both said attachment surface and said connection surface are configured to include opposite halves of a hook and loop-type fastener, said hook and loop-type fastener including a plurality of hooks configured to be complemental to a plurality of loops, said hooks being removably connectable to said loops, allowing said connection surface to be removably attached to said attachment surface.

* * * * *